J. D. THOMPSON.
TOOL HOLDER.
APPLICATION FILED MAR. 30, 1908.
922,210.
Patented May 18, 1909.
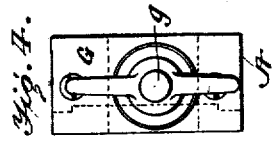
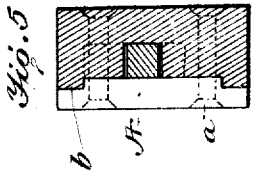
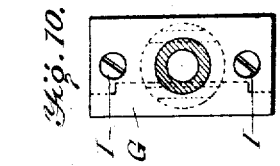
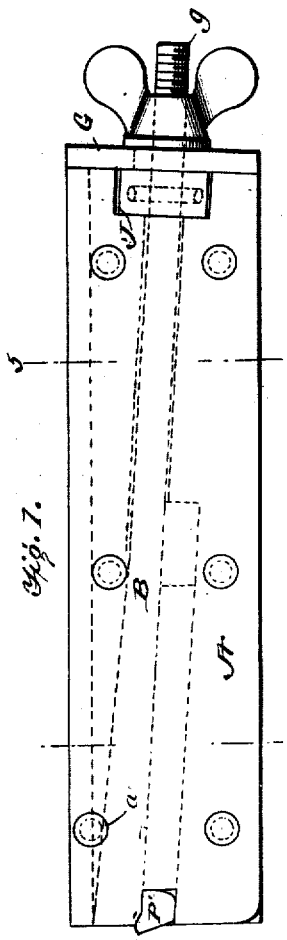
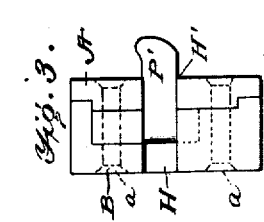
WITNESSES
INVENTOR
JAY D. THOMPSON,
BY
ATTORNEYS

UNITED STATES PATENT OFFICE.

JAY D. THOMPSON, OF CALUMET, MICHIGAN.

TOOL-HOLDER.

No. 922,210.　　　Specification of Letters Patent.　　Patented May 18, 1909.

Application filed March 30, 1908. Serial No. 424,079.

*To all whom it may concern:*

Be it known that I, JAY D. THOMPSON, a citizen of the United States, and a resident of Calumet, in the county of Houghton and State of Michigan, have invented certain new and useful Improvements in Tool-Holders, of which the following is a specification.

My invention relates to that class of tool holders which are used on turning and planing machines for metal working where the economical use of tool-steel as a factor in shop economy is largely practiced which will supplant the use of large bars of tool steel formerly used with a cutting edge as a cutting tool, and one in which may be inserted a replaceable small piece of tool steel, one of a number of, or set of such pieces adapted, each with a cutting edge modified to suit the particular kind of work for which the tool is adapted, wherein the wear or loss of such small tools will reduce the holder's maintenance to a minimum.

My invention has for objects to furnish an easy and accessible means for adjusting and fastening the tool used without undue strain tending to shift the holder from its fixed position in the tool-rest of the machine.

With these and other objects in view my invention consists of a taper-headed bolt fitted in an aperture in a suitable frame, and means to effect the gripping of the shank of a tool within said aperture by the shifting of said tapered bolt.

My invention consists further in certain novel features and construction, arrangement and combination of parts as will be hereinafter fully described and pointed out in the claim, reference being had to the accompanying drawings, in which—

Figure 1 is an elevation of my improved tool holder. Fig. 2 is a plan view of the same. Fig. 3 is an end view, and Fig. 4 a view of the opposite end. Fig. 5 is a vertical section on line 5—5 of Fig. 1. Fig. 6 is a vertical section on line 6—6 of Fig. 8. Fig. 7 is an end view of the front plate or member of the frame. Fig. 8 is an elevation and part section of the holder with the front member or plate removed exhibiting the mechanism clamping the tool. Fig. 9 is a top plan view partly in section at one end. Fig. 10 is an end view of Fig. 8, with the adjusting nut or thumb bolt in part section showing mode of attaching thrust plate.

The frame or holder as shown consists of two members A and B united by screws or rivets $a$, the member B being recessed as at $b'$ to receive the shoulder portion $b$ of the member A, the two together forming a close joint. In the member B is a recess or aperture C one wall $e$ of which is shaped to receive the tapered or wedge shaped end $d$ of the bolt D, the other end of the said aperture being narrowed down and having parallel walls to receive the straight end of the bolt; the lower wall $e'$ of said aperture is on a different slant from that of the upper wall $e$ and serves as a rest for the tool E, said lower wall extending back of the center of the holder sufficiently far to adapt the aperture to accommodate various lengths of tools and having a shoulder $e^2$ at such end thus narrowing the aperture to support the straight end $d'$ of the bolt D which is threaded as shown at $g$ in Fig. 8, to receive a threaded nut formed of the two parts F and F' forming an annular groove H in said nut to receive the fixed plate G which acts as a thrust bearing in which the nut swivels to advance and retract the tapered bolt D to clamp or release the tool E. The thrust plate G is secured to the portion B by means of the screws I. The end of the frame slotted at J with the thrust plate G forms a pocket for the reception of the collar F' forming part of the thumb nut, said collar being secured to the part F by the pins K seated in registering grooves L in the parts F and F' such parts so arranged forming the annular grooves before referred to. The design of the nut, however may be of any other suitable shape if preferred, whereby the adjustment may be made by the immediate use of the thumb nut or with an ordinary wrench or a hexagon nut.

The shank of tool E is preferably of square cross-section, although it may partake of a wedge shape to assist in the clamping action sought, and the taper head of D which is usually of rectangular cross section may be of any other shape if desirable.

H and H' are slots right and left handed, in the end of the portions A and B, provided for the reception of the bent end P' of the tool E. Q is the space reserved for the reception of the shank of tools of various lengths.

It will be noticed that the tool E in Fig. 8 held between the straight and divergent walls E and E' of aperture C, is held with a very firm grip between the jaws formed by said walls and allows of an exceedingly easy adjustment. With the straight extended end P of tool as shown in Figs. 8 and 9, it is adapted to the use of turning and planing.

In Figs. 1, 2, and 3 the device is adapted to take a boring tool, the end P' being bent and supported in the slots H and H' in A and B; the tool in this form admits the holder passing through carrying the tool point in advance to the full depth of the bore of the piece to be bored. The lower face R of the tapered head *d* may be milled to more firmly adhere to the tool.

The holder is held fast by means of a suitable rest attached to the machine carrying the work to be finished, and the same holder may be used for boring, turning or facing without removal by the interchange of any tool suitable to the work. The turning tool P may be removed by the shifting of the taper head and the boring tool P' inserted in its stead, and secured by the simple adjustment of the nut F—F'. The holder may be used in an inverted position in the tool rest of the machine, from that shown in the drawings, with the tool also inverted or not.

It is manifest that in carrying out my invention the precise details of structure above set forth may be modified without departing from the spirit of the invention, and I do not wish the invention to be understood as restricted to such details.

I claim—

A device of the character described, comprising a body portion, a tool and a bolt, said body portion and tool being provided with means whereby the tool may be clamped in the body portion by a longitudinal movement of said bolt, there being a recess formed in the rear of the body portion, a thrust plate, means for securing said thrust plate to the end of the body portion, a nut threaded upon the rear end of the bolt, said nut comprising a body portion which lies outside of the thrust plate, a reduced portion which passes through said thrust plate, a collar which lies inside of said thrust plate, and means for securing said collar to the reduced portion of the nut, substantially as shown and described.

JAY D. THOMPSON.

Witnesses:
EVA E. MEYER,
A. E. PETERMANN.